United States Patent
Schoser et al.

(10) Patent No.: US 7,348,546 B2
(45) Date of Patent: Mar. 25, 2008

(54) POSITION MEASURING SYSTEM WITH A SCANNING UNIT HAVING A REFERENCE PULSE SIGNAL DETECTION UNIT

(75) Inventors: Jürgen Schoser, St. Georgen (DE); Michael Hermann, Tacherting (DE); Wolfgang Holzapfel, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 33 days.

(21) Appl. No.: 11/350,460

(22) Filed: Feb. 9, 2006

(65) Prior Publication Data
US 2006/0180748 A1 Aug. 17, 2006

(30) Foreign Application Priority Data
Feb. 11, 2005 (DE) ............ 10 2005 006 247

(51) Int. Cl.
*G01D 5/34* (2006.01)
(52) U.S. Cl. .............. 250/231.13; 250/231.14; 250/231.18; 33/1 PT; 341/13
(58) Field of Classification Search ........ 250/231.13, 250/231.14, 231.16, 231.17, 231.18; 33/1 PT; 341/11, 13; 356/614–618
See application file for complete search history.

(56) References Cited

U.S. PATENT DOCUMENTS

| 3,985,448 | A | 10/1976 | Wiklund et al. |
| 6,097,490 | A | 8/2000 | Holzapfel et al. |
| 6,664,535 | B1 * | 12/2003 | Nahum et al. ........ 250/231.14 |
| 7,002,137 | B2 * | 2/2006 | Thorburn et al. ...... 250/231.13 |
| 7,193,204 | B2 * | 3/2007 | Mitchell ............... 250/231.13 |
| 2004/0036016 | A1 | 2/2004 | Homer et al. |

FOREIGN PATENT DOCUMENTS

| EP | 0 887 625 A2 | 12/1998 |
| WO | WO 02/065061 A1 | 8/2002 |

OTHER PUBLICATIONS

R.M. Pettigrew, "Analysis of Grating Imaging and its Application to Displacement Metrology," SPIE vol. 136 1st European Congress on Optics Applied to Metrology (1977), pp. 325-332.

* cited by examiner

*Primary Examiner*—Patrick J. Lee
(74) *Attorney, Agent, or Firm*—Brinks Hofer Gilson & Lione

(57) ABSTRACT

A position measuring system having a scale that includes an incremental graduation track, which extends in a measuring direction, the incremental graduation track having a periodic arrangement of graduation areas with different optical properties and a reference marking in a reference position, which has an aperiodic arrangement of graduation areas. A scanning unit including a light source and an opto-electronic detector arrangement having a reference pulse signal detection unit for generating a reference pulse signal. A periodic strip pattern results in a detection plane, which is amplitude-modulated in an area of the reference position, wherein the reference pulse signal detection unit includes several reference pulse signal detection elements, which create the reference pulse signal so that a periodic signal portion, as well as low-frequency signal portions are filtered out of the incremental graduation track to a large degree.

26 Claims, 10 Drawing Sheets

POSITION MEASURING SYSTEM WITH A SCANNING UNIT HAVING A REFERENCE PULSE SIGNAL DETECTION UNIT

Applicants claim, under 35 U.S.C. § 119, the benefit of priority of the filing date of Feb. 11, 2005 of a German patent application, copy attached, Serial Number 10 2005 006 247.4, filed on the aforementioned date, the entire contents of which is incorporated herein by reference.

BACKGROUND OF THE INVENTION

1. Field of the Invention

The present invention relates to a position measuring system which is suitable for generating position-dependent scanning signals, in particular for generating at least one reference pulse signal.

2. Discussion of Related Art

Besides incremental signals regarding the relative offset of two parts which are movable with respect to each other, known position measuring systems as a rule also provide reference pulse signals at one or several defined reference positions. With a defined relative position of the parts, which are movable with respect to each other and are connected with the scanning unit and the scale of the position measuring system, it is possible to provide an absolute reference by the position measurement which otherwise takes place relatively. The elements which are movable with respect to each other can be a workpiece, as well as a tool of a numerically-controlled machine tool, for example.

Regarding the arrangement of the reference markings on the side of the scale, there now exist a number of known possibilities. For example, they can be arranged on the scale laterally adjacent to the incremental track. However, with this variation it is problematic in principle that in case of a possible twisting, or de-adjustment, of the scale and the scanning unit around an axis parallel with the scale or scanning plane the exact assignment of the resulting reference pulse signal to a defined period of the incremental signals possibly is no longer assured at all. To overcome this problem it is known, for example from U.S. Pat. No. 3,985,448, the entire contents of which are incorporated herein by reference, to integrate one or several reference markings into the incremental graduation track on the scale. For this purpose it is possible, for example, to leave one or several lines out of the periodic incremental graduation track at the desired reference position along the measuring track in the incremental graduation.

Regarding the physical scanning principle, a differentiation is made in optical position measuring systems between systems with and without an optical collimation device in front of the light source used. If no optical collimation device is employed, this is generally called a divergent illumination. Such position measuring systems are advantageous in particular in regard to a compact total construction.

Solutions are today already known from the publications EP 0 887 625 A2 and WO 02/065061 A1 for generating a reference pulse signal in position measuring systems with divergent illumination, which results from the scanning of a reference marking which had been integrated into the incremental graduation track on the scale.

However, the variations for the generation of a reference pulse signal proposed in these publications have not been shown to be optimal in regard to as good as possible an efficiency of the reference pulse signal generation, low interference with the incremental signals, or the greatest possible elimination of the influence of the generated incremental signals on the reference pulse signal.

OBJECTS AND SUMMARY OF THE INVENTION

It is therefore an object of the instant invention to disclose a position measuring system which does not have an optical collimation device and makes possible a dependable generation of a reference pulse signal from the scanning of an incremental graduation track, into which a reference marking is integrated. Here it is intended to interfere as little as possible with the generation of incremental signals.

This object is attained a position measuring system having a scale that includes an incremental graduation track, which extends in a measuring direction, the incremental graduation track having a periodic arrangement of graduation areas with different optical properties and a reference marking in a reference position, which has an aperiodic arrangement of graduation areas. A scanning unit, wherein the scale and the scanning unit move in relation to each other in the measuring direction, the scanning unit including a light source without an optical collimator arrangement placed in front of the light source and an opto-electronic detector arrangement having a reference pulse signal detection unit, which is matched to the reference marking for generating a reference pulse signal. A periodic strip pattern results in a detection plane, which is amplitude-modulated in an area of the reference position, wherein the reference pulse signal detection unit includes several reference pulse signal detection elements, which are dimensioned in such a way and interconnected for creating the reference pulse signal, and act as bandpass filters on the strip pattern at the reference position, and that the reference pulse signal is present on an output side of the opto-electronic detector arrangement from which a periodic signal portion, as well as low-frequency signal portions are filtered out of the incremental graduation track to a large degree.

Now, in accordance with the invention the embodiment of the reference pulse signal detector unit is provided in such a way that it acts as a bandpass filter on the strip pattern resulting in the detection plane, which is amplitude-modulated at the reference position in order to generate in this way a reference pulse signal of the desired width.

The action of the reference pulse signal detector unit as a bandpass filter has the result that the base frequency of the scanned incremental graduation, inclusive of higher harmonics, is eliminated from the amplitude-modulated signal in the detector plane in the same way as a signal portion which changes only relatively slowly. But signal portions with frequencies in an interval around approximately half the incremental signal basic frequency continue to be accumulated unattenuated for generating a reference pulse signal of the desired width. Thus, in the end a suitable frequency band for generating the reference pulse signal is filtered out of the detected scanning signal.

In a possible embodiment, one of possibly several reference pulse signal detector units contains three reference pulse signal detection elements which are, for one, positioned in a defined geometric manner with respect to each other, and are furthermore suitably interconnected for generating the desired reference pulse signal. Besides a centrally arranged reference pulse signal detector element, two reference pulse signal detector elements, which are symmetrically arranged in the measuring direction, are preferably provided in this case which, regarding the incremental track, each generate scanning signals offset by whole number multiples of 360° with respect to the centrally arranged reference pulse signal detector element. It is provided to interconnect the centrally arranged reference pulse signal detector element, on the one hand, and the two reference pulse signal detector elements arranged symmetrically with respect to it, on the other hand, differently. The finally resulting difference signal represents the reference pulse signal.

In an advantageous embodiment of the instant invention, the width of the centrally arranged reference pulse signal detector element is selected to be twice as large as the width of one of the two reference pulse signal detection elements arranged symmetrically to it.

On the part of the scale, or in the incremental graduation track, the aperiodic arrangement of partial areas which represents the integrated reference marking is preferably realized by the insertion of at least one so-called bright field. In this case the bright field interferes with the periodicity of the incremental graduation track and in an incidental light system includes a partial area of increased reflectivity, or in a transmitted light system of a partial area of greater transparency.

In a first possible embodiment the width of the bright field in the measuring direction is preferably selected to be 1.5 times as large as the graduation period of the incremental graduation track. This is achieved in that an originally opaque partial area is changed into a reflecting or transmitting one. This represents the least possible change of the periodicity of the incremental graduation track at which a dependable reference pulse generation is simultaneously assured. In another embodiment the width of the bright field can also be selected to be twice as large as the graduation period of the incremental graduation track.

The distance of the bright field from an adjoining graduation area of increased reflectivity or increased transparency preferably is 1.5 times that of the graduation period of the incremental graduation track.

In a further advantageous embodiment, a reference marking at a reference position of the measuring track includes several bright fields integrated into the incremental graduation track. The spatial distribution of the bright fields has here been selected in such a way that the auto-correlation of their distribution results in a maximally useful signal with respect to the reference pulse signal. Analogously to this it has been provided on the part of the scanning unit to arrange several spaced-apart reference pulse signal detection units within the detector arrangement. These are preferably identically designed. Such an embodiment of the position measuring system in accordance with the present invention has been shown to be advantageous for increasing the efficiency, or the useful portion of the reference pulse signal to be generated. In particular, an increased insensitivity in regard to various signal interferences, such as scale soiling/contamination, position tolerances of the light source, etc., results.

In a further embodiment, the formation of at least two bright fields as reference markings in the incremental graduation track has been provided. On the scanning side, at least two reference pulse signal detection units are provided, each of which includes two reference pulse signal detection elements spaced apart in the measuring direction. These detect phase signals which are phase-shifted by 180° with respect to each other. The reference pulse signal detection elements with different phase relations are again differently interconnected, the difference signal represents the reference pulse signal. The sequence of differently phased reference pulse signal detection elements in the measuring direction is provided in such a way that they are arranged in alternating sequence from one detector unit to the other detector unit in order to achieve averaging of the resulting reference pulse signal.

The various steps in accordance with the present invention can be realized in connection with different light sources. For example, one light source can function as a point light source in the form of a VCSEL (vertical cavity surface emitting laser). However, it is moreover possible to also employ a spatially extending light source, for example an LED. In the latter case is has been shown to be advantageous to pre-arrange a substantially periodic grating graduation with transparent and opaque graduation areas in the scanning beam path of the light source. This then functions in a known manner as a so-called transmission graduation. To assure the generation of a reference pulse signal from the reference marking integrated into the incremental graduation, it is necessary on the part of the transmission graduation to also match a defined spatial area to the reference marking and to form a corresponding aperiodic graduation structure. For example, this can take place in such a way that at least one of the transparent or opaque graduation areas exists in an area of the otherwise periodic graduation structure of the transmission graduation.

The different steps in accordance with the present invention can of course be realized in connection with linear, as well as rotary position measuring systems. Furthermore, position measuring systems can be designed in accordance with the present invention, which are operated in transmitted light, or in incident light.

Further advantages, as well as details of the instant invention ensue from the following description of exemplary embodiments by the attached drawing figures.

DETAILED DESCRIPTION OF THE PREFERRED EMBODIMENTS

Figure 1:
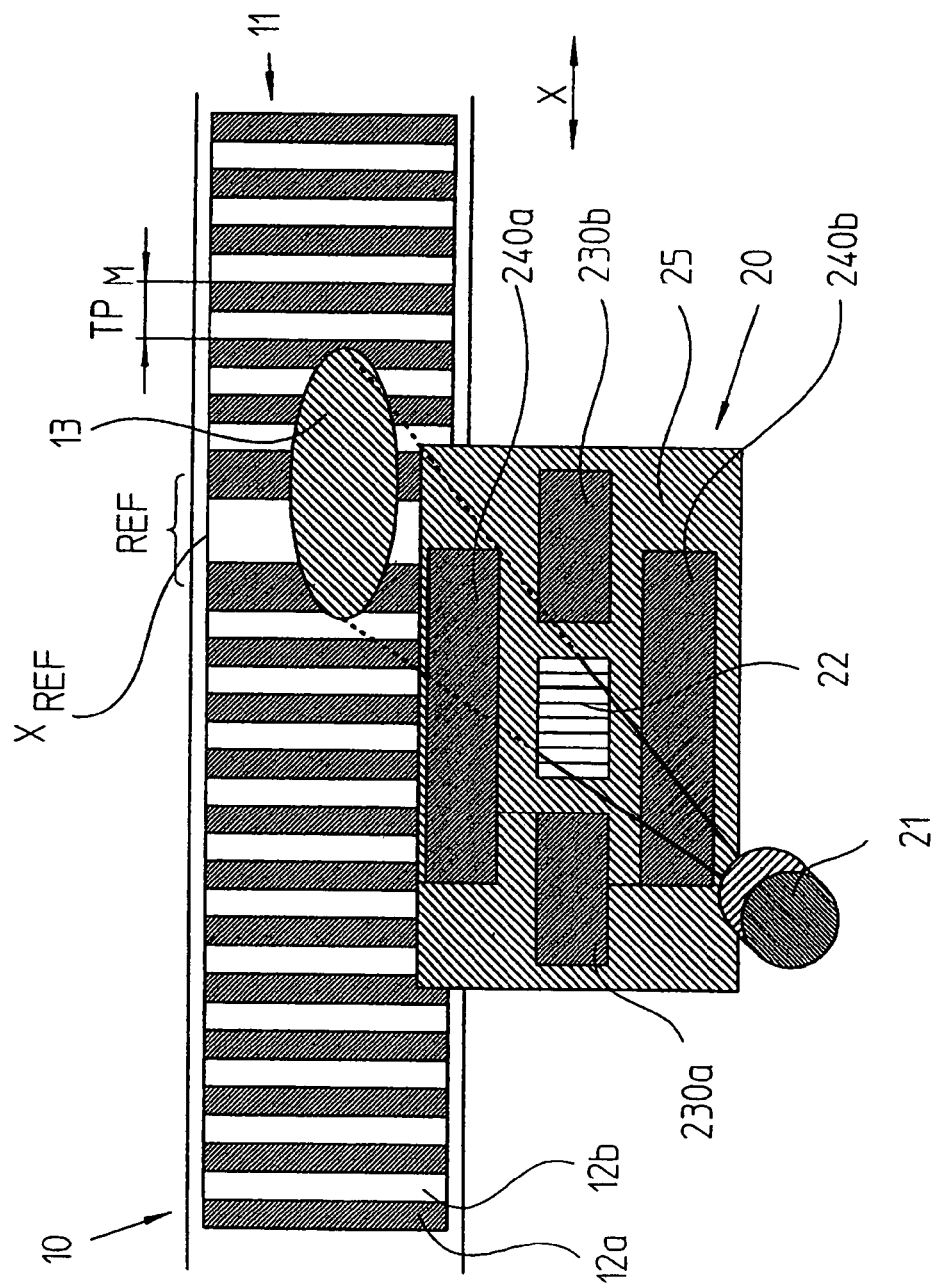
FIG. 1 is a greatly schematized perspective representation of an exemplary embodiment of a position measuring system in accordance with the present invention.

A first exemplary embodiment of a position measuring system in accordance with the present invention is shown greatly schematized in a perspective representation in FIG. 1. In this case this exemplary embodiment is designed as a linear position measuring system operated in incident light.

The position measuring system represented in FIG. 1 includes a scale 10, as well as a scanning unit 20, which are arranged movable with respect to each other in the measuring direction x. The scale 10 and the scanning unit 20 are connected to two objects which are movable with respect to each other and whose relative position is to be detected. These objects can be, for example, machine elements on a machine tool. On the output side, the position measuring system delivers position-dependent scanning signals, which are supplied to an electronic follow-up device such as a numeric machine tool control. The scanning signals are further processed in a known manner by the electronic follow-up device for controlling the machine.

The scale 10 of the position measuring system in accordance with the present invention includes an incremental graduation track 11 extending in the measuring direction x. In the example represented, the incremental graduation track 11 includes an arrangement, substantially periodic in the scanning direction x, of graduation areas 12a, 12b with different reflecting properties. In this case the graduation areas 12a have a lesser reflectivity, and in what follows will also be inter alia called dark fields, the graduation areas 12b have high reflectivity and will also be called bright fields in what follows. With the exception of the at least one reference marking REF, the arrangement of the graduation areas 12a, 12b, or bright and dark fields, is periodic with the incremental graduation period $TP_M$. A reference marking REF is integrated into the incremental graduation track 11 in the area of a reference position $x_{REF}$. The reference marking REF includes an aperiodic arrangement of graduation areas 12a, 12b, which differs from the otherwise periodic arrangement thereof. Accordingly, a locally limited interference is introduced via the reference marking REF into the otherwise regular structure of the incremental graduation track 11; in an advantageous embodiment one or several graduation areas 12b, or bright fields, for example, are introduced into the periodic incremental graduation track 11. Regarding further details in connection with the actual embodiment of suitable reference markings REF, and the reference pulse signals resulting therefrom, reference is made to the subsequent description.

In the course of the otherwise purely incremental position measurement a reference signal is generated from the scanning of the reference marking REF, which is evaluated in a known manner by the electronic follow-up device, and which makes possible the production of an absolute reference during position determination.

The scanning unit 20, which is movable in the measuring direction x with respect to the scale 10, includes a number of further components for generating the position-dependent scanning signals. In the present example this includes inter alia a light source 21 which, in accordance with the present invention, does not have an upstream arranged optical collimator arrangement, a grating graduation in the form of a transmission graduation 22, as well as an opto-electronic detector arrangement including several incremental signal detector elements arranged in the areas with the reference numerals 230a, 230b, as well as several reference pulse signal detection elements in the areas 240a, 240b. The areas 230a, 230b, 240a, 240b of the opto-electronic detector arrangement are indicated in FIG. 1 only greatly schematized, reference is also made to the subsequent description regarding detail of the detector units placed there. Since in particular no optical collimator arrangement is provided in the scanning beam path, but a divergent illumination instead, the scanning unit 20 of the position measuring system in accordance with the present invention can be designed to be very compact.

As can be seen in FIG. 1, the transmission graduation 22, as well as the opto-electronic detector arrangement, are arranged on a scanning plate 25 which, for example, includes a small glass plate.

In the represented example the light emitted by the light source 21, for example an LED, initially passes without a collimation taking place, through the transmission graduation 22 centrally arranged in the scanning plate 25. Subsequently the diverging beams impinge on a defined area of the scale 10, which is identified as scanning surface 13 in what follows. In the instant example the scanning surface 13 is designed elliptically and with its elliptical center axis extends in the measuring direction x. Retro-reflection of the beams in the direction of the scanning unit 20, or scanning plate 25 takes place from the (reflection) scale 10 of this exemplary embodiment. There, a periodic strip pattern is generated in the detection plane because of the resulting interaction of the beams with the different graduations in the scanning beam path. In case of a relative movement between the scale 10 and the scanning unit 20, this strip pattern is periodically modulated in a known manner, is detected by the detector elements of the opto-electronic detector arrangement and converted into position-dependent scanning signals, which are further processed by the electronic follow-up device.

Regarding the scanning principle, the scanning beam path of the explained exemplary embodiment corresponds to a so-called three-grating sensor with divergent illumination, such as is known from the publication by R. M. Pettigrew with the title "Analysis of Grating Images and its Application to Displacement Metrology" in SPIE, vol. 136, 1st European Congress on Optics Applied to Metrology (1977), pp. 325 to 332.

In the example in FIG. 1, the first grating through which a passage occurs includes the transmission graduation 22, the scanned scale 10 represents the second grating, while the third grating is formed by a periodic design of the detector arrangement in the form of a known structured detector arrangement. For example, such a structured detector arrangement includes a multitude of individual narrow rectangular-shaped detector elements, which are arranged to extend in the measuring direction x. For incremental signal generation those detector elements are connected with each other in an electrically conducting manner, which generate equiphased scanning signals by scanning the strip pattern projected thereon. In the case of customary quadrature evaluation, four groups of incremental scanning signals exist, which have respective phase offsets of 90° from each other. Preferably so-called single field scanning is realized by such a detector arrangement, in which four detector elements of different phase are placed within a scanned strip pattern period. In this way it is possible to obtain all four signal portions of the incremental signal from the scanning of a single strip pattern period. Scanning results, which offers insensitivity in particular to dirt.

It is particularly advantageous if the detector elements are made of amorphous silicon (α-Si), since in this case it is possible to realize especially delicate structures. This is of particular importance in case of resultant small strip pattern periods in the detection plane, wherein in case of conventional silicon detector elements problems with signal crosstalk between adjoining detector elements of different phase often occur.

In the case of scanning the incremental graduation track 11 outside of the reference marking REF, the strip pattern resulting in the detector plane is periodic with the strip pattern period $TP_s$ in the present example. Because of the aperiodic structure in the incremental graduation track, the strip pattern resulting in the area of the reference marking REF is disturbed; the scanning signal shows an amplitude modulation at this position $x_{REF}$. The reference pulse signal RI is generated from the detection of the amplitude modulation of the strip pattern in this area via suitably designed reference pulse signal detection elements. How an embodiment of the reference pulse signal detection elements in accordance with the present invention takes place, which in FIG. 1 is arranged in the areas 240a, 240b, will be described in detail in the course of the subsequent description.

As already indicated above, the principles in accordance with the present invention can of course also be transferred to rotary position measuring systems, wherein the scale includes a graduated disk with an incremental graduation track in the shape of a circle. Furthermore, alternatively to the present example it is also possible to design a transmitted light system based on considerations in accordance with the present invention. Then the incremental graduation track on the scale would include alternatingly arranged partial areas of different transparency; furthermore, in such a case the scanning unit would have to be designed in a known manner in such a way that it would extend around the scale, i.e. the light source and the transmission graduation on the one hand, as well as the detector arrangement on the other hand, would be arranged on oppositely located sides of the scale.

In the case of the realization of a transmitted light system, in accordance with the above explanations a bright field would therefore correspond to a partial area of increased transparency, a dark field to a partial area with reduced transparency.

Moreover, it would also be possible within the framework of the instant invention to do without the transmission graduation in case of the use of a point light source in place of the extended LED as in the above explained example. In this case the central area of the scanning plate would be designed to be completely transparent to the emitted light beams.

Figure 2A:
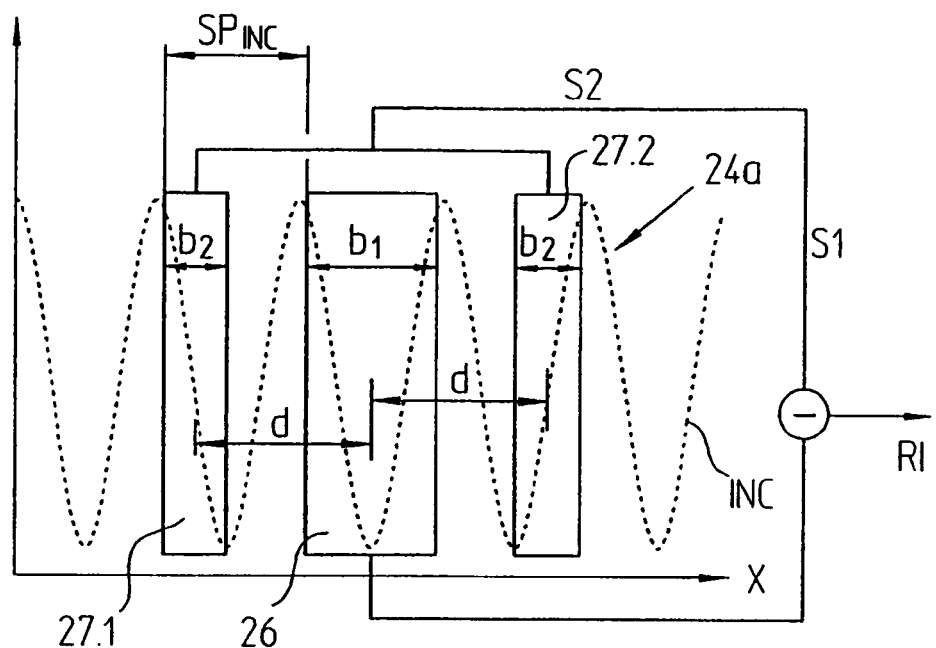
FIG. 2a is a schematic view from above on a portion of an embodiment of a reference pulse signal detection unit used with the position measuring system of FIG. 1 in connection with a generated incremental signal.
Figure 2B:
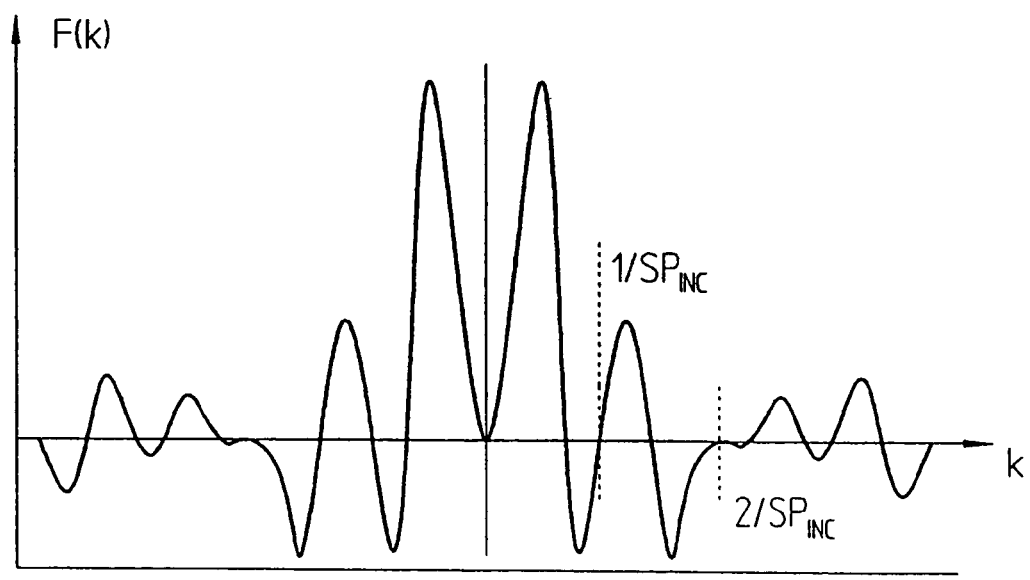
FIG. 2b is a representation of the real portion of a filter function of the reference pulse signal detection element from FIG. 2a acting as a bandpass filter.

Reference is now made to FIGS. 2a and 2b for further explaining the steps in accordance with the present invention on the detector side. Here, FIG. 2a shows a schematic view from above on a portion of a reference pulse signal detection unit 24a in connection with an incremental scanning signal INC, the filter function F(k), which is a part of such an embodiment, of the reference pulse signal detection unit from FIG. 2a acting as a bandpass filter is represented in FIG. 2b.

As already mentioned above, in accordance with the present invention an embodiment of the reference pulse signal detection element is provided in such a way, that it acts as a bandpass filter on the strip pattern which results in the detection plane and is amplitude-modulated at the reference position $x_{REF}$, in order to create a reference pulse signal RI of the desired width. The effect of the reference pulse signal detection element as a bandpass filter has the result that the base frequency $f_{INC}$ of the scanned incremental graduation, inclusive of higher harmonics thereof, is eliminated from the amplitude-modified scanning signal in the detection plane the same as a further signal portion which only changes relatively slowly. But signal portions of frequencies at a defined interval around approximately half the incremental signal base frequency $f_{INC}/2$ are continuously accumulated without weakening for the generation of a reference pulse signal RI of the desired width. Thus, in the end a suitable frequency band for the generation of the reference pulse signal RI is filtered out of the detected scanning signal.

The second reference pulse signal detection unit 24b in the example of FIG. 1 is in principle constructed identical to the reference pulse signal detection unit 24a in FIG. 2a. In accordance with FIG. 1, the reference pulse signal detection units 24a, 24b are arranged in the areas 240a, 240b on the scanning plate 25.

In what follows it will be explained how the bandpass functionality for generating a reference pulse signal RI can be realized by the appropriate embodiment of a reference pulse signal detection element 24a, for example. In the exemplary embodiment represented, the reference pulse signal detection unit 24a includes three individual reference pulse signal detection elements 26, 27.1, 27.2. The desired bandpass filtering of the amplitude-modulated strip pattern, or of the corresponding scanning signal at the reference position $x_{REF}$, substantially takes place by the geometric dimensioning, as well as the interconnection of the reference pulse signal detection elements 26, 27.1, 27.2 in order to generate in this way the desired reference pulse signal RI. A central reference pulse signal detection element 26, as well as two reference pulse signal detection elements 27.1, 272, which are symmetrically arranged with respect to it, are provided in the present example for this purpose. For filtering, the width $b_1$ of the centrally arranged reference pulse signal detection element 26 is preferably selected to be equal to the signal period $SP_{INC}$ of the generated incremental signals INC.

In this way an averaging of the sinusoidal incremental signal INC over a signal period $SP_{INC}$ results the course of scanning the strip pattern in the detection plane, and by this the desired filter effect with respect to the periodic incremental signal portion. The widths $b_2$ of the two symmetrically arranged reference pulse signal detection elements 27.1, 27.2 are for one selected to be identical, and are also equal to half the width $b_1$ of the central reference pulse signal detection element 26, i.e. $b_2=\frac{1}{2}*b_1$.

The transparency characteristics of a bandpass filter can generally be described in a known manner by its filter function F(k), wherein the frequency portions of the respective signal which have been allowed to pass through are identified by k. In the exemplary embodiment of the reference pulse signal detection unit 24a in FIG. 2a, the associated filter function F(k) with the distribution of the spatial frequency portions k let through by it can be described by the following equation (Equ. 1):

$$F(k) = \frac{\sin(\pi b_1 k)}{\pi k} - 2\eta \frac{\sin(\pi b_2 k)}{\pi k} \cos(2\pi d k) \qquad \text{Equation 1}$$

The following applies with respect to the individual values in (Equ. 1):
- k: spatial frequency,
- $b_1$: width of the central reference pulse signal detector element,
- $b_2$: width of one of the two outer reference pulse signal detector elements,
- d: distance of one of the two outer reference pulse signal detector elements from the central reference pulse signal detector element,
- η: relative weighting, or area relationship between the two outer reference pulse signal detector elements and the central reference pulse signal detector element.

The course of the filter function F(k) for the parameter combination
$b_1$=35 μm, $b_2$=35μ, ρ=1 and d=48.75 μm
of the reference pulse signal detection unit 24a in FIG. 2a is represented in FIG. 2. The zero points in the course of the filter function F(k) at the base frequency $f_{INC}$=1/$SP_{INC}$ of the incremental signal, as well as at their harmonics, such as for example at 2/$SP_{INC}$ etc., can be clearly seen in FIG. 2b. But as explained above, a passed-through frequency band in the range of half the base frequency of the incremental signal $f_{INC}$ is allowed to pass through and is used as reference pulse signal.

As a function of the freely selectable parameters $b_1$, $b_2$ and η of the reference pulse signal detection unit, in the present case it is possible to show a condition in the form of (Equ. 2) for the distance d between the central reference pulse signal detection element and an outer reference pulse signal detection element from (Equ. 1), in order to construct a reference pulse signal detection unit, from which, as explained, the base frequency $f_{INC}$=1/$SP_{INC}$ of the incremental signal, and possibly its harmonic, from the resulting reference pulse signal:

$$d = \frac{SP_{INC}}{2\pi} * \arccos\left[\frac{1}{2\eta}\frac{\sin\left(\frac{\pi b_1}{SP_{INC}}\right)}{\sin\left(\frac{\pi b_2}{SP_{INC}}\right)}\right] - zSP_{INC} \quad \text{Equation 2}$$

wherein:
- z: whole number,
- $SP_{INC}$: signal period of the incremental signal,
- $b_1$: width of the central reference pulse signal detector element,
- $b_2$: width of the two outer reference pulse signal elements.

For each value combination of $b_1$, $b_2$ and η for which a mathematical solution exists, (Equ. 2) provides an embodiment of the reference pulse signal detection unit, which generates a reference pulse signal with the base frequency filtered out. As will be explained in what follows, (Equ. 2) is simplified for particularly advantageous embodiments of detector arrangements.

In the example represented in FIG. 2a, the two outer reference pulse signal detection elements 27.1, 27.2 are arranged in relation to the central reference pulse signal detection element in such a way that scanning signals are generated by this which, in the general case N*360° (N=1, 2, 3, . . . ), are phase-shifted with respect to the scanning signal of the central reference pulse signal detection element 26. In the case of FIG. 2a, N=1 and a width relation $b_2$=½*$b_1$ were selected for the two reference pulse signal detection elements 27.1, 27.2. For this arrangement, the simplified relationships (Equ. 3.1) or (Equ. 3.2) result from (Equ. 2) for the distance d between the centers of the central reference pulse signal detection element 26 and the two outer reference pulse signal detection elements 27.1 or 27.2 to be selected:

$$d=n*SP_{INC}+0.5b_2 \quad \text{Equation 3.1}$$

$$d=n*SP_{INC}-0.5b_2 \quad \text{Equation 3.2}$$

wherein:
- $SP_{INC}$: is the signal period of the incremental signal,
- $b_2$: the width of one of the two outer reference pulse signal detection elements,
- n=0, 1, 2, 3, . . .

For generating the reference pulse signal RI it is furthermore provided in connection with the example of FIG. 2a for one to interconnect the two outer reference pulse signal detection elements 27.1, 27.2 together for the signal S2, and in turn to interconnect this signal S2 in difference with the resulting signal S1 of the central reference pulse signal detection element 26. Finally, the signal resulting from the difference interconnection of the signals S1 and S2 represents the reference pulse signal RI at the output side.

Finally, a layout of the reference pulse signal detection elements 26, 27.1, 27.2 as a bandpass takes place by such a design of the reference pulse signal detection elements 26, 27.1, 27.2 in the form of the selected geometry and interconnection. By this bandpass, a frequency band is filtered out of the strip pattern resulting in the detection plane with the impressed interference from the reference marking REF integrated in the incremental graduation track 11, which represents the actual reference pulse signal RI.

Now further exemplary embodiments for the design of the transmission graduation, scale, reference pulse signal detection elements, as well as the resultant signal courses in the position measuring system in accordance with the invention will be explained by the subsequent drawing figures.

Figure 3A:
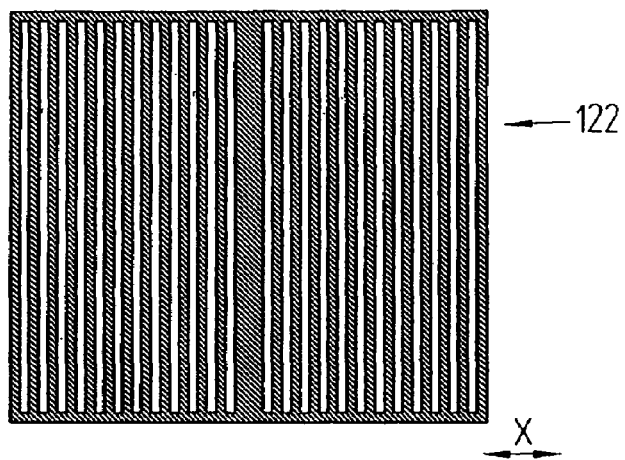
FIGS. 3a to 3c each show a portion of an embodiment of a transmission grating, an associated scale and a detector arrangement to be used with the position measuring system of FIG. 1 in accordance with the present invention.
Figure 3B:
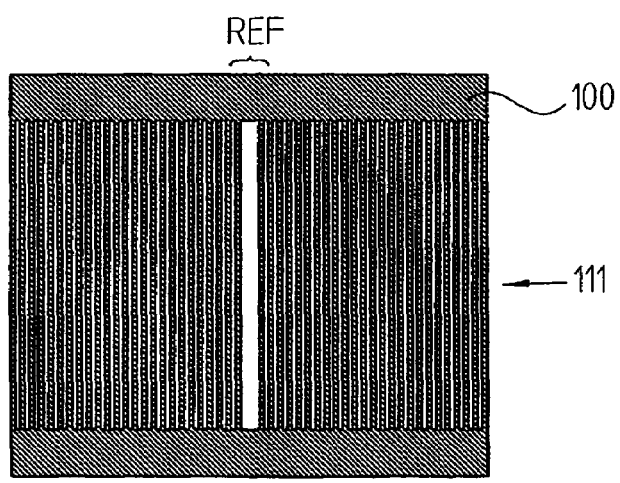

Here, FIG. 3a shows a transmission graduation 122 of a further embodiment of the position measuring system in accordance with the present invention, a portion of the scanned scale 100 with the incremental graduation track 111, including a reference marking REF is represented in FIG. 3b.

This exemplary embodiment of the position measuring system is also designed as an incident light system, i.e. the partial areas of the incremental graduation track 111, which are alternatingly arranged in the measuring direction x, have different optical reflection properties. The partial areas represented bright in FIG. 3b are embodied as highly-reflective partial areas or bright fields, the partial areas shown dark represent low-reflecting dark fields. The reference marking REF and the reference position $x_{REF}$ is constituted by an additional bright field at this location, by which the periodicity of the incremental graduation track 111 is disturbed. In this example the periodicity $TP_M$ of the incremental graduation track 111 has been selected in accordance with $TP_M$=20 μm, the width of a partial area is 10 μm. The reference marking REF, or the bright field in the scale 100 in this example has a width of 30 μm, which corresponds to 1.5 times the periodicity $TP_M$ of the incremental graduation track 111. This width selection is shown to be advantageous, since in this way the periodicity of the incremental graduation track is disturbed as little as possible.

Alternatively to this it is also possible to design a bright field of a width of 40 μm, which thus corresponds to twice the graduation period of the incremental graduation track. In this case it is advantageous if the bright field of the reference marking REF is arranged in the incremental graduation track 111 in such a way that in the measuring direction x the distance from the next adjoining graduation area of increased brightness, or bright field (or increased transparency in case of transmitted light) takes up a maximum width, wherein the number of omitted graduation areas of increased reflectivity or increased transparency is selected to be as minimal as possible. Preferably the distance of the bright field in the measuring direction x from the next adjoining graduation area of increased reflectivity on the scale is 1.5 times the graduation period of the incremental graduation track 111.

In accordance with FIG. 3a, a substantially periodic structure in the measuring direction x has been provided on the part of the transmission graduation 122. The partial areas represented bright in FIG. 3a are embodied to be optically transparent, the partial areas represented dark are embodied to be optically opaque. The periodicity $TP_S$ of the transmission graduation 122 in this example is $TP_S=40$ μm. Matched to the embodiment of the reference marking REF on the scale 100, in this example a transparent partial area is left out on the part of the transmission graduation 122 in the central area, i.e. an aperiodicity of this graduation structure in the shape of a centrally arranged dark field of a width of 60 μm is realized, which approximately corresponds to 1.5 times the periodicity $TP_S$ of the transmission graduation 122. Such a selection of the dark field width is shown to be advantageous, since in this way only a minimal modification of the otherwise periodic transmission graduation 122 results.

Figure 3C:
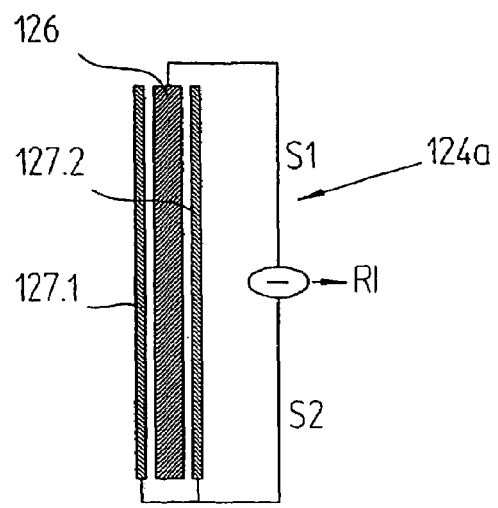

In principle, the aperiodicity, or the dark field, in the transmission graduation 122 could also be arranged decentered alternatively to FIG. 3c, the possible width of the dark field can be selected to be in the range between 40 μm and 80 μm.

An associated reference pulse signal detection unit 124a is schematically represented in FIG. 3c. Here, the design corresponds in principle to that of the explained exemplary embodiment in FIG. 2. The reference pulse signal detection unit 124a again includes a centrally located reference pulse signal detection element 126 of the width $b_1=35$ μm, each of the two outer reference pulse signal detection elements 127.1, 127.2 have widths of $b_2=17.5$ μm. The central reference pulse signal detection element 126 is arranged in the plane of the scanning plate (not represented) and the centered extended position of the scale bright field, or of the reference marking REF. Analogously with the previous example, the interconnection of the various reference pulse signal detection elements 126, 127.1, 127.2 takes place for generating the reference pulse signal RI.

Figure 4A:
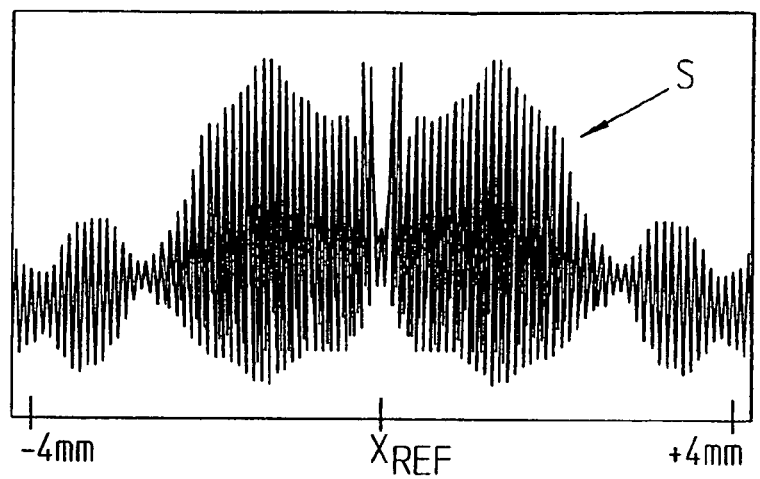
FIGS. 4a to 4c respectively show different associated signals in connection with the example in FIGS. 3a to 3c.

The total scanning signal S resulting from the scanning of the strip pattern in the detection plane of the scanning unit in the range of +/−4 mm around the reference position $x_{REF}$ is represented in FIG. 4a for a system with the scale 100 and the transmission graduation 122 from FIGS. 3a and 3b. Here, the high-frequency incremental signal portion, which is used for the high-resolution position determination, can be clearly seen in the representation. Superimposed on this signal portion, or impressed on it in accordance with the amplitude in the area of the reference position $x_{REF}$, is the clearly low-frequency signal portion which stems from the interference with the periodicity of the incremental graduation track 111 in this area. If, as in the present case, the transmission graduation 122 has a dark field in the central area as an aperiodicity of the otherwise periodic transmission graduation, the result on the total scanning signal S in accordance with FIG. 4a is a signal breakdown in the area of the reference position $x_{REF}$ in regard to the envelope of this signal.

Figure 4B:
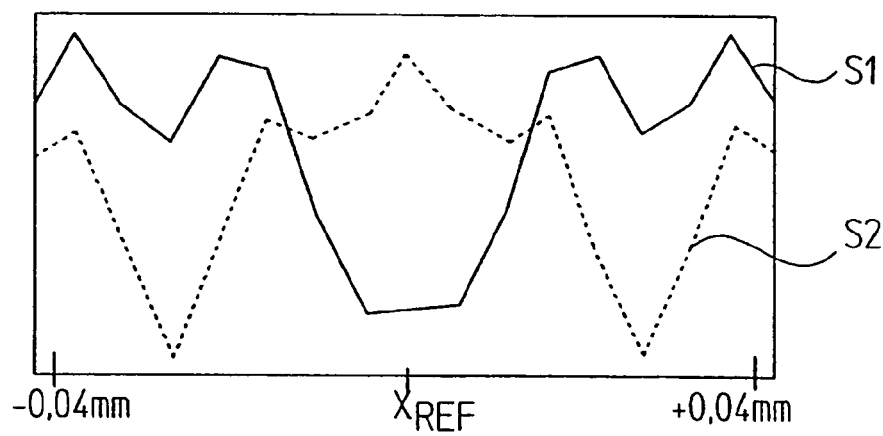
Figure 4C:
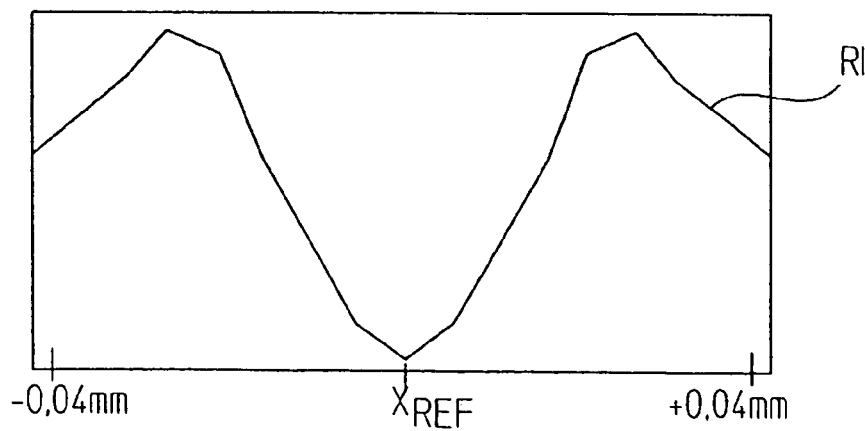

By the above explained design of the reference pulse signal detection unit 124a this signal breakdown in the total scanning signal S can now be converted in a highly-resolved reference pulse signal RI at the output side. In FIG. 4b the signal S1 from the second reference pulse signal detection element 126 on the one hand, and on the other the resulting signals S2 from the symmetrically arranged reference pulse signal detection units 127.1, 127.2, are represented in the area +/−0.04 mm around the reference position $x_{REF}$. As can be seen from FIG. 4b, both signals still have a superimposed periodicity in their amplitude course, which is to be put down to the effect of the incremental track 111. Finally, in FIG. 4c the reference pulse signal RI is shown, which results after forming the difference from S1 and S2, which shows a clear signal breakdown in the area +/−0.04 mm around the reference position $x_{REF}$. The period portion of the incremental signal in the reference pulse signal RI has been filtered out by the formation of the difference between S1 and S2 which took place. A reference pulse signal RI has been provided, which has a positionally high resolution and can be further processed in a known manner by an electronic follow-up device. The high-resolution reference pulse signal RI was filtered out of the total scanning signal S by the design in accordance with the present invention of the reference pulse signal detection element 124a.

A further exemplary embodiment for laying out a transmission graduation, a scale, the associated reference pulse signal detection element, as well as the various courses of the signals is represented in FIGS. 5a to 5c and 6a to 6c analogously with the previous example. In the subsequent explanation of these drawing figures only the important differences with the previous example will be explained.

Figure 5A:
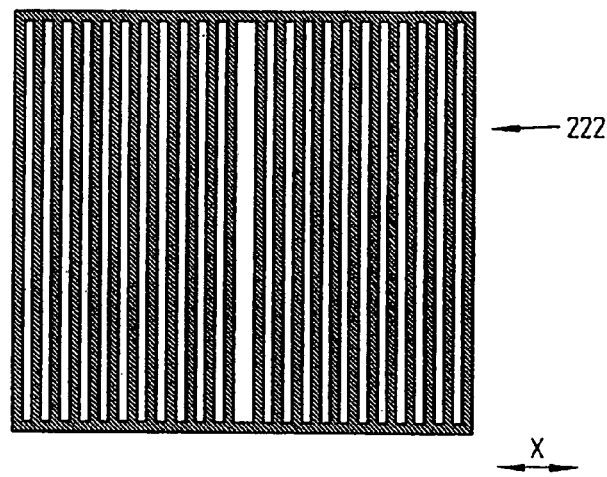
FIGS. 5a to 5c each show a portion of a second embodiment of a transmission grating, an associated scale and a detector arrangement to be used with the position measuring system of FIG. 1 in accordance with the present invention.
Figure 5B:
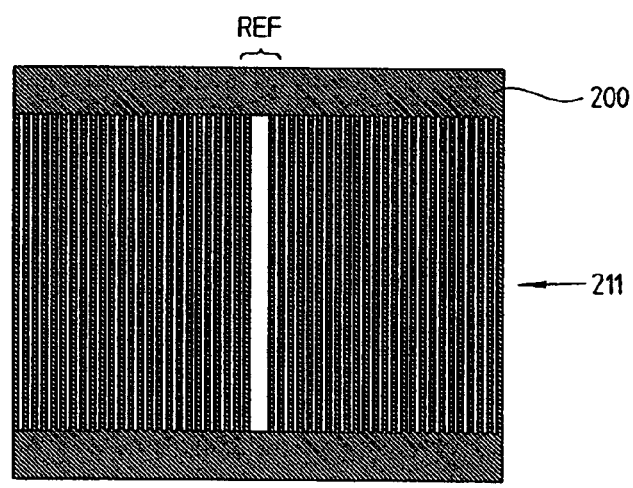
Figure 5C:
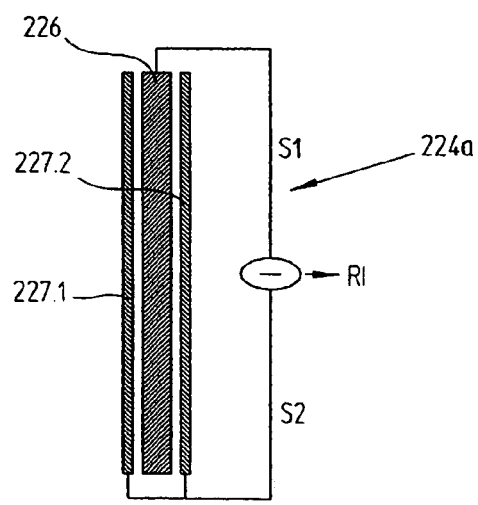

While here the embodiment of the scale 200 with the incremental graduation track 211 and the reference marking has been selected to be identical with the previous example, as represented in FIG. 5a the transmission graduation 222 differs from it. Thus it is now provided to form a bright field, which is widened in the measuring direction x by a width of 60 μm, in a central area of the transmission graduation 222. This is accomplished by leaving out at least one opaque partial area of this graduation structure. The width of a suitable bright field in the transmission graduation can be selected to lie within a range between 36 μm and 110 μm. As in the previous example, the periodicity $TP_S$ of the transmission graduation 222 is $TP_S=40$ μm, the width of a partial area is 20 μm in the measuring direction x.

The scale 200, as well as the reference pulse signal detection unit 224a, are designed identically with respect to the previous example.

Figure 6A:
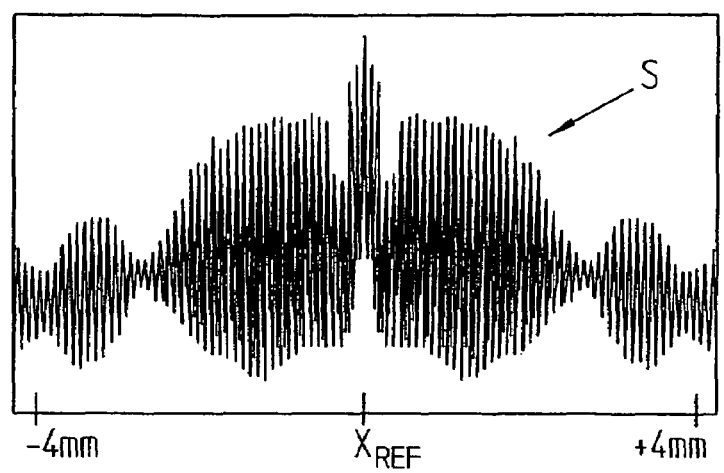
FIGS. 6a to 6c respectively show different associated signals in connection with the example in FIGS. 5a to 5c.

As can be seen from FIG. 6a, because of the different layout of the transmission graduation 222 a signal maximum of the envelope of the total scanning signal S now exists at the reference position $x_{REF}$; in the previous example a signal breakdown existed at this location.

Figure 6B:
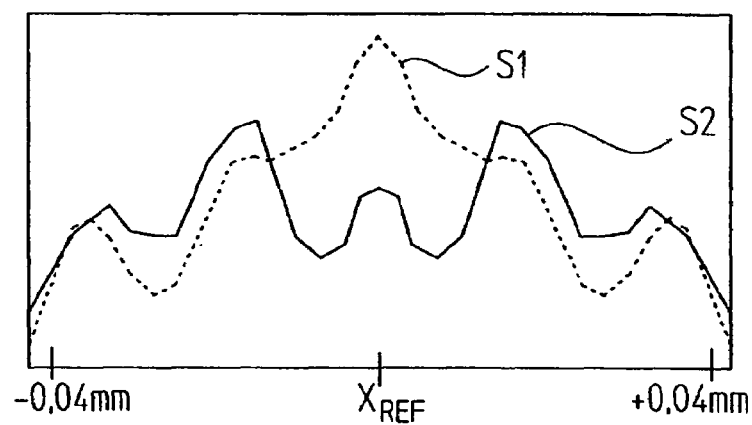
Figure 6C:
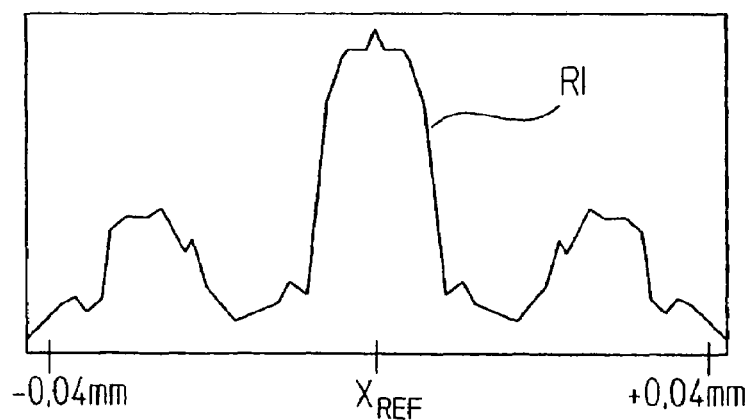

This appears in the same way in the signals S1 and S2, as well as in the resultant reference pulse signal RI, as represented in FIGS. 6b and 6c. This means that in this example the reference position $x_{REF}$ is marked by a clear signal increase. Analogously with the previous example it can again be seen from FIG. 6c that, because of the steps in accordance with the present invention, filtering of the periodic incremental signal portion takes place at the reference pulse signal RI.

A further variation for generating a reference pulse signal in accordance with the invention will be explained in what follows by FIGS. 7a to 7c, as well as 8a to 8c. The representation of the different components of the position measuring system which are important for generating a reference pulse signal, as well as the representation of the various signals again corresponds to the representation in the two previous examples. In what follows, essentially only the differences of this embodiment will be explained in what follows.

Figure 7A:
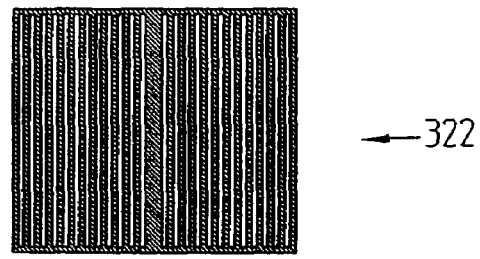
FIGS. 7a to 7c each show a portion of a third embodiment of a transmission grating, an associated scale and a detector arrangement to be used with the position measuring system of FIG. 1 in accordance with the present invention.
Figure 7B:
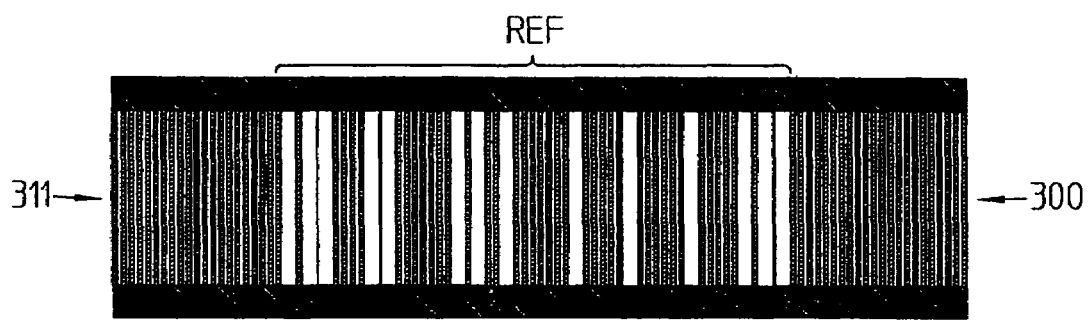

As explained in FIG. 7b with the scale representation it is important in connection with this example that now not only a single bright field has been integrated as the reference marking $x_{REF}$ into the incremental graduation track 311 of the scale 300, but a plurality of such bright fields. The reference marking of this exemplary embodiment includes a distribution of fourteen bright fields, or highly reflective partial areas, extending in the measuring direction x, each of which results from leaving out a non-reflecting partial area of the incremental graduation track, as explained above. As explained above, each individual bright field has a width in the measuring direction x of 30 µm or 40 µm, the incremental graduation track 311 also has a periodicity, or graduation period $TP_M=20$ µm, with a width of the partial area of 10 µm.

The transmission graduation 322 of this exemplary embodiment is embodied identically with that of the exemplary embodiment in FIG. 3a, and it is represented in FIG. 7a. This means that it has an aperiodicity in the shape of a centrally arranged dark field. As to the rest, reference is made to the above mentioned data of this graduation.

In this example the detector side, which will be explained by FIG. 7c, has been designed to match the plurality of bright fields of the reference marking REF of the scale 300. A total of fourteen units of individual reference pulse signal detection units are provided for detecting the reference pulse signal, such as had been required in the previous examples for the detection of a single bright field in the incremental graduation track. Here, each one of the reference pulse signal detection units has been designed identically to the single unit of the preceding examples and includes a central reference pulse signal detection element, as well as two reference pulse signal detection elements arranged symmetrically with it. As can be seen in FIG. 7c, the signals from the central reference pulse signal detection elements resulting from scanning the strip pattern are added together for the signal S1, the signals from the respective reference pulse signal detection elements located on the outsides for the signal S2. The signals S1 and S2 are in turn interconnected in difference, the reference pulse signal RI results as the difference signal.

Figure 8A:
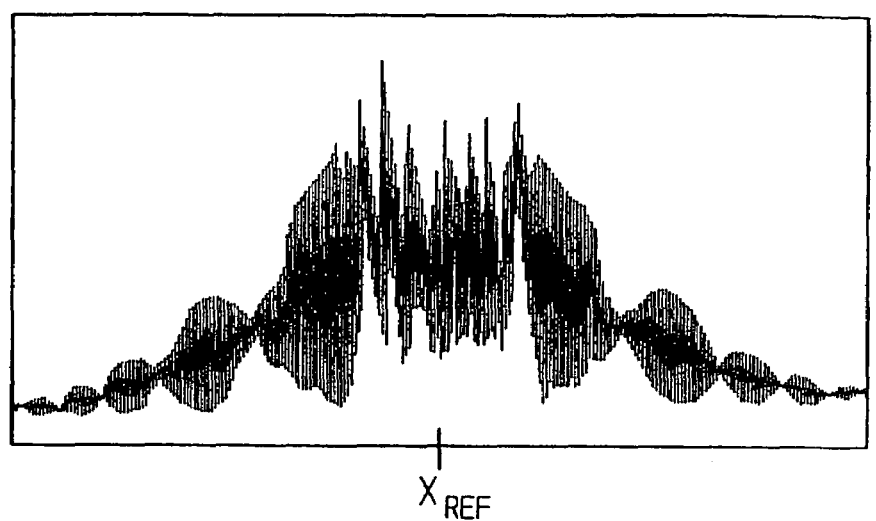
FIGS. 8a to 8c respectively show different associated signals in connection with the example in FIGS. 7a to 7c.
Figure 8B:
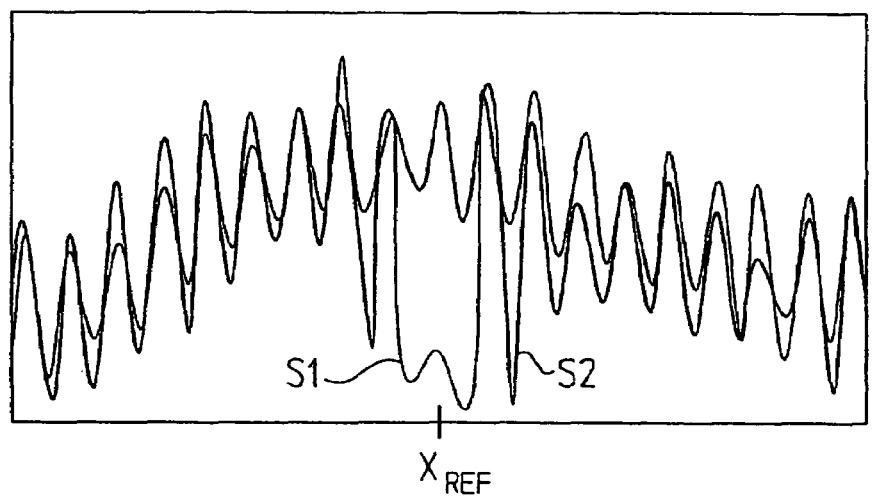
Figure 8C:
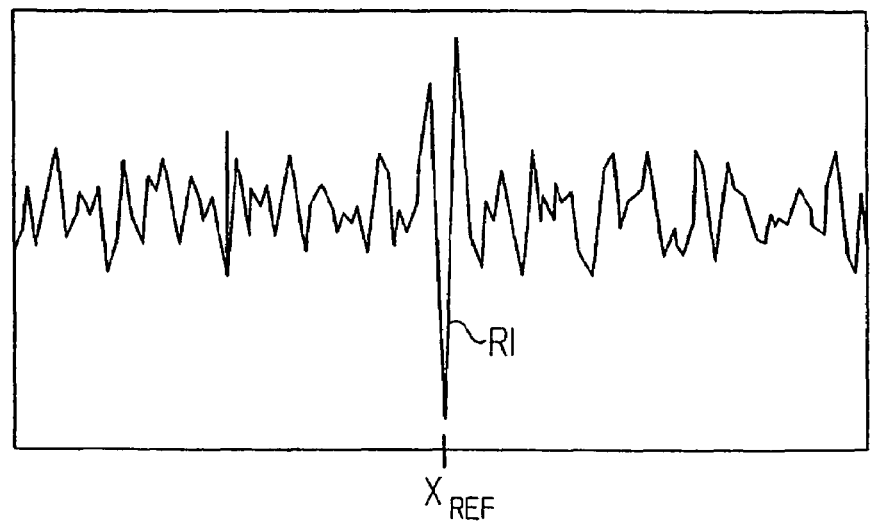

Analogously to the previous examples, in FIG. 8a the total signal S resulting from the scanning is represented in the area +/−4 mm around the reference position $x_{REF}$, in FIG. 8b the signals S1 and S2 from the plurality of detector element units in the range +/−0.2 mm around the reference position $x_{REF}$. Finally, FIG. 8c represents the resulting difference signals, or the reference pulse signal RI at the output side, in which a noticeable reduction of the effects results because of the steps taken in accordance with the present invention.

Figure 7C:
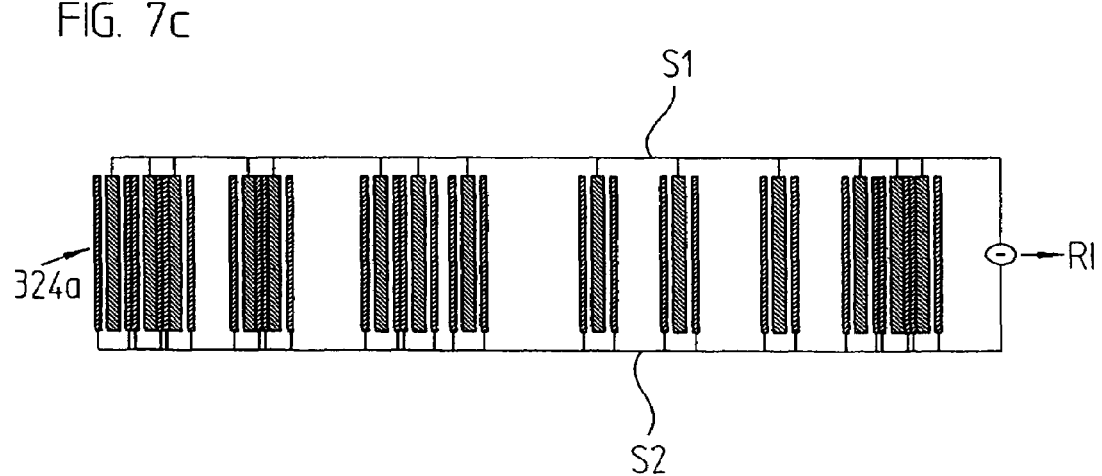

If such an embodiment with several reference pulse signal detection units is selected, these are arranged in the measuring direction x over a defined area, as can be seen in FIG. 7c. Here, some usable space in the form of intermediate areas still exists in part between adjoining reference pulse signal detection units. These intermediate areas can be used, for example, for arranging incremental signal detector elements in addition there.

This variation with a multitude of bright fields in the reference marking is advantageous for increasing the efficiency, or the usable portion of the reference pulse signal to be generated.

Figure 9A:
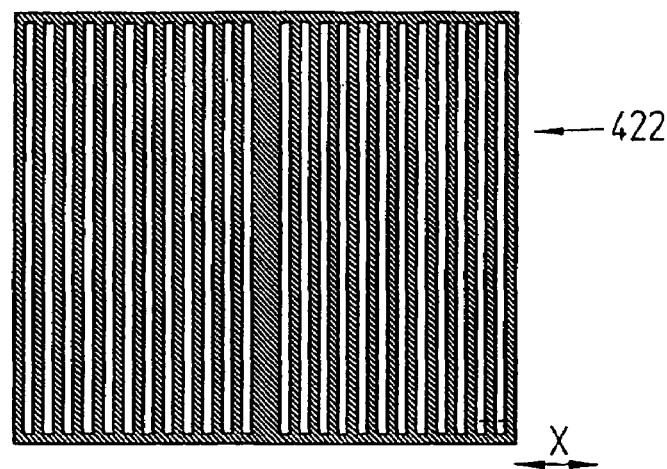
FIGS. 9a to 9c each show a portion of fourth embodiment of a transmission grating, an associated scale and a detector arrangement to be used with the position measuring system of FIG. 1 in accordance with the present invention.
Figure 9B:
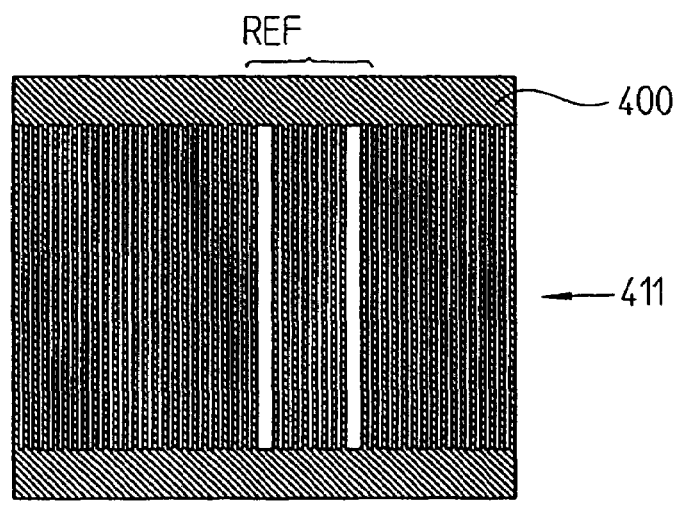

In conclusion, further possible embodiments for suitable reference pulse signal detection units, including the associated structures on the scale and the transmission grating will be explained by the subsequent FIGS. 9a to 9c. as well as 10a to 10c.

FIG. 9b of the exemplary embodiment of FIGS. 9a to 9c again shows a part of the scanned incremental graduation track 411 on the scale 400. The reference marking REF is constituted by two bright fields, i.e. by partial areas of increased reflectivity in the case of incident light scanning, or of increased transparency in case of transmitted light scanning. The transmission graduation 422 represented in FIG. 9a is designed identical with the previous examples.

Figure 9C:
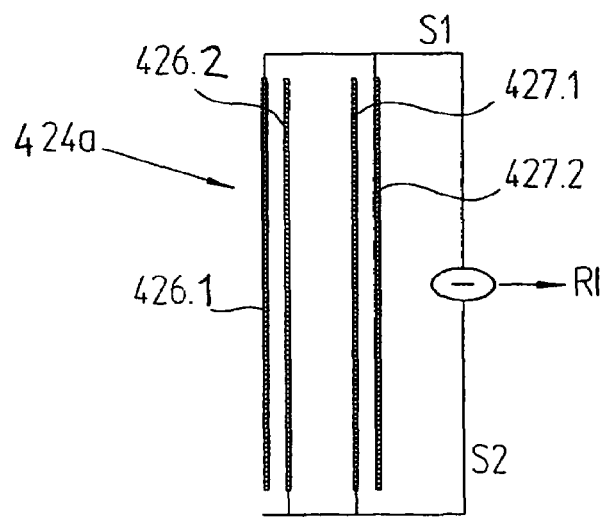

A reference pulse signal detection unit 424a, which is suitable for scanning this reference marking REF is represented in FIG. 9c. It is composed of two pairs of reference pulse signal detection elements 426.1, 426.2, and 427.1, 427.2. Within each pair, the distance between the pairs of reference pulse signal detection elements 426.1, 426.2, 427.1, 427.2, is $SP_{INC}$ and thus corresponds to the signal period of the incremental signal, or of the corresponding strip pattern period in the detection plane. The two reference pulse signal detection elements 426.1, 426.2, or 427.1, 427.2 of a pair produce counter-phase scanning signals S1 and S2, or those which are phase-shifted by 180° which, as in the previous examples, are interconnected in difference, so that the reference pulse signal RI results at the output. It should furthermore be mentioned that the sequence of the individual reference pulse signal detection elements which produce phase-shifted scanning signals S1, S2, changes, or is reversed, from one adjoining pair to the next adjoining pair in the measuring direction x. Thus, starting at the left in the drawing figure, the reference pulse signal detection element 426.1 is arranged first and delivers the signal S1, then the reference pulse signal detection element, which generates the signal S2, follows in this pair. Exactly reversed, in the next pair of reference pulse signal detection elements, the reference pulse signal detection element 427.1, which delivers the signal S2 is arranged to be first, and only then does the reference pulse signal detection element 427.2 for generating the signal S1 follows, etc. In this way a symmetry results over the entire arrangement of reference pulse signal detection elements, which removes errors in the scanning signal by averaging.

Figure 10A:
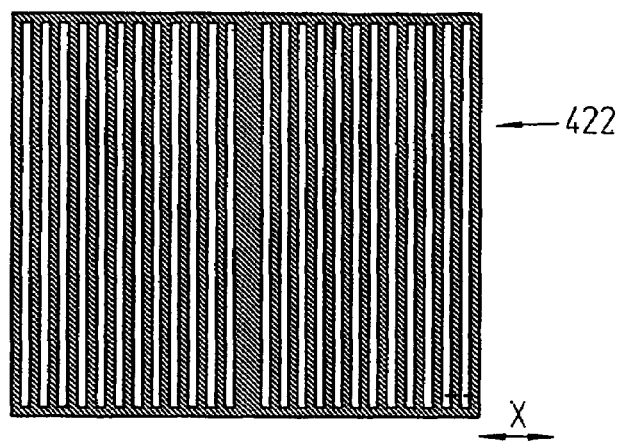
FIGS. 10a to 10c each show a portion of a fifth embodiment of a transmission grating, an associated scale and a detector arrangement to be used with the position measuring system of FIG. 1 in accordance with the present invention.
Figure 10B:
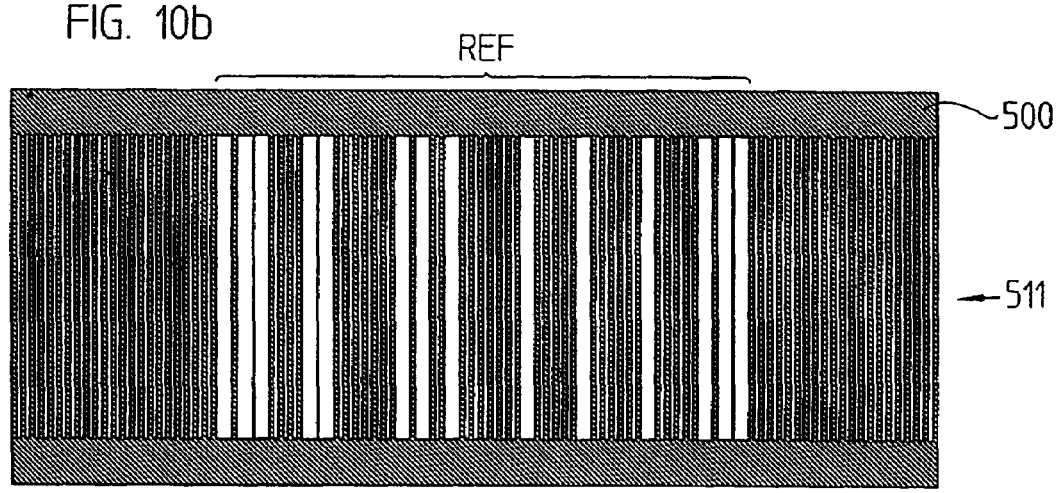
Figure 10C:
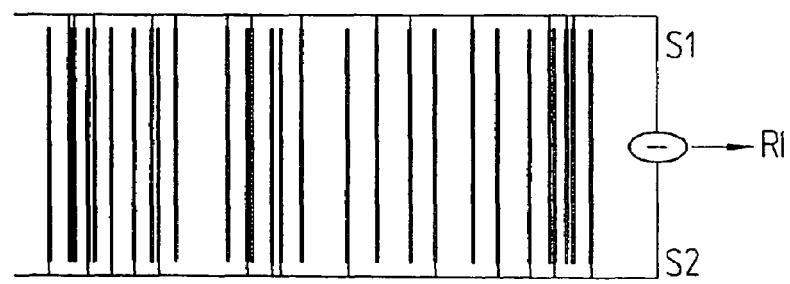

Moreover, analogously to the example of FIGS. 7a to 7c, this variation can be expanded to form an embodiment which provides a multitude of such bright fields in the incremental graduation track. Representations of the transmission graduation 422, the scale 500 with the integrated reference marking REF, as well as the associated detector arrangement, are shown in FIGS. 10a to 10c. Complementing the remarks in connection with the previous example, reference should only be made again to the alternating sequence of the reference pulse signal detection elements in adjoining pairs. Thus, the reference pulse signal detection elements of the first pair, starting at the left, provide S2 and S1 signals, the next pair provides S1 and S2 signals, etc. In this example, too, the total symmetry of the detector arrangement is assured.

Besides the described exemplary embodiments, alternative embodiments of course also exist within the framework of the instant invention. The foregoing description is provided to illustrate the invention, and is not to be construed as a limitation. Numerous additions, substitutions and other changes can be made to the invention without departing from its scope as set forth in the appended claims.

We claim:

1. A position measuring system for generating position-dependent scanning signals, comprising:
   a scale comprising:
      an incremental graduation track, which extends in a measuring direction, said incremental graduation track comprises:
         a periodic arrangement of graduation areas with different optical properties; and
         a reference marking in a reference position, wherein said reference marking is integrated into said incremental graduation track and comprises an aperiodic arrangement of graduation areas;
   a scanning unit, wherein said scale and said scanning unit move in relation to each other in said measuring direction, said scanning unit comprising:
      a light source without an optical collimator arrangement placed in front of said light source; and
      an opto-electronic detector arrangement comprising a reference pulse signal detection unit, wherein said reference pulse signal detection unit is matched to said reference marking for generating a reference pulse signal, and wherein a periodic strip pattern results in a detection plane, wherein said periodic strip pattern is amplitude-modulated in an area of said reference position, wherein said reference pulse signal detection unit comprises several reference pulse signal detection elements, wherein said several reference pulse signal detection elements are dimensioned in such a way and interconnected for creating said reference pulse signal, and said several reference pulse signal detection elements act as bandpass filters on said strip pattern at said reference position, and that said reference pulse signal is present on an output side of said opto-electronic arrangement from which a periodic signal portion, as well as low-frequency signal portions are filtered out of said incremental graduation track to a large degree.

2. The position measuring system in accordance with claim 1, wherein said reference pulse signal detection unit comprises:
   a centrally arranged reference pulse signal detection element;
   two additional reference pulse signal detection elements arranged symmetrically in said measuring direction with respect to said centrally arranged reference pulse signal detection element;
   wherein said two additional reference pulse signal detection elements generate scanning signals which are offset by N*360° (N=1, 2, . . . ) with respect to said centrally arranged reference pulse signal detection element, and said centrally arranged reference pulse signal detection element on the one hand, and said two additional reference pulse signal detection elements, on the other hand, are interconnected to generate a difference signal that represents said reference pulse signal.

3. The position measuring system in accordance with claim 2, wherein a width ($b_1$) of said centrally arranged reference pulse signal detection element is selected to be twice a size of a width ($b_2$) of said two reference pulse signal detection elements.

4. The position measuring system in accordance with claim 3, wherein said width ($b_1$) of said centrally arranged reference pulse signal detection element is selected to be equal to a signal period ($SP_{INC}$) of an incremental signal.

5. The position measuring system in accordance with claim 2, wherein a distance of said centrally arranged reference pulse signal detection element from said two additional reference pulse signal detector elements is selected to be in accordance with $$d = \frac{SP_{INC}}{2\pi} * \arccos\left[\frac{1}{2\eta} \frac{\sin\left(\frac{\pi b_1}{SP_{INC}}\right)}{\sin\left(\frac{\pi b_2}{SP_{INC}}\right)}\right] - zSP_{INC}$$

wherein:
   z: whole number,
   $SP_{INC}$: signal period of an incremental signal generated by scanning said incremental graduation track,
   $b_1$: width of said central reference pulse signal detection element,
   $b_2$: width of said two additional reference pulse signal detection elements.

6. The position measuring system in accordance with claim 2, wherein a distance (d) of said centrally arranged reference pulse signal detection element from said two additional reference pulse signal detection elements is selected in accordance with:

$$d = n*SP_{INC}+0.5b_2$$

or $$d = n*SP_{INC}-0.5b_2$$

wherein:
   $SP_{INC}$: is a signal period of an incremental signal generated by scanning said incremental graduation track,
   $b_2$: a width of one of said two additional reference pulse signal detection elements,
   n=0, 1, 2, 3, . . .

7. The position measuring system in accordance with claim 1, wherein at least one bright field is integrated into said incremental graduation track in an area of said reference marking, which interferes with a periodicity of said incremental graduation track, and wherein said bright field comprises a graduation area of increased reflectivity or increased transparency.

8. The position measuring system in accordance with claim 7, wherein in said measuring direction said bright field has a width which corresponds to twice a graduation period ($TP_M$) of said incremental graduation track.

9. The position measuring system in accordance with claim 7, wherein in said measuring direction said bright field has a width which corresponds to 1.5 times a graduation period ($TP_M$) of said incremental graduation track.

10. The position measuring system in accordance with claim 7, wherein said bright field is arranged such that in said measuring direction a distance from a nearest adjoining graduation area with increased reflectivity or increased transparency on said scale assumes a maximum width, wherein a number of omitted graduation areas of increased reflectivity or increased transparency is selected to be as minimal as possible.

11. The position measuring system in accordance with claim 10, wherein said distance of said bright field in said measuring direction from said nearest adjoining graduation area on said scale is 1.5 times said graduation period ($TP_M$) of said incremental graduation track.

12. The position measuring system in accordance with claim 7, wherein said reference marking comprises several bright fields arranged distributed in said measuring direction.

13. The position measuring system in accordance with claim 1, wherein said opto-electronic detector arrangement for generating said reference pulse signal comprises several reference pulse signal detection units arranged spaced apart from each other in said measuring direction.

14. The position measuring system in accordance with claim 13, wherein said several reference pulse signal detection units are identical to one another.

15. The position measuring system in accordance with claim 7, wherein said opto-electronic detector arrangement for generating said reference pulse signal comprises several reference pulse signal detection units arranged spaced apart from each other in said measuring direction.

16. The position measuring system in accordance with claim 15, wherein said reference pulse signal detection units are identical to one another.

17. The position measuring system in accordance with claim 1, wherein said reference pulse signal detection unit comprises two pairs of reference pulse signal detection elements;
- wherein for each of said two pairs of reference pulse signal detection elements, one of said pulse signal detection element is arranged with another of said pulse signal detection elements with a distance therebetween in said measuring direction being equal to a whole number multiple of said incremental signal;
- wherein for each of said two pairs of reference pulse signal detection elements, a first scanning signal and a second signal are generated and which are phase-shifted by 180° with respect to each other;
- wherein those reference pulse signal detection elements that generate said first scanning signals are interconnected to generate a first resultant scanning signal and those reference pulse detection elements that generate said second scanning signals are interconnected to generate a second resultant scanning signal; and
- wherein said first resultant scanning signal and said second resultant scanning signal being interconnected in difference to generate said reference pulse signal.

18. The position measuring system in accordance with claim 17, wherein at least two bright fields in said incremental graduation track comprises said reference marking and said scanning unit comprises several pairs of reference pulse signal detection elements, which are arranged following each other in said measuring direction, wherein an alternating sequence of said reference pulse signal detection elements with differently phased scanning signals is provided in adjoining pairs.

19. The position measuring system in accordance with claim 1, wherein on one side of said scanning unit a substantially periodic transmission graduation with transparent and opaque graduation areas is arranged upstream of said light source, which has at least one area matched to said reference marking (REF) by an aperiodic graduation structure.

20. The position measuring system in accordance with claim 19, wherein at least one of said transparent and opaque graduation areas is not provided in an area of said substantially periodic transmission graduation with said aperiodic graduation structure.

21. The position measuring system in accordance with claim 20, wherein exactly one of said transparent and opaque graduation areas is not provided in said area of said substantially periodic transmission graduation with said aperiodic graduation structure.

22. The position measuring system in accordance with claim 19, wherein said scanning unit comprises a scanning plate, wherein
said substantially periodic transmission graduation is arranged in a central area, incremental signal detector elements are arranged adjacent to said substantially periodic transmission graduation, and at least one reference pulse signal detection unit is arranged perpendicularly with respect to said measuring direction adjoining said substantially periodic transmission graduation.

23. The position measuring system in accordance with claim 22, wherein several reference pulse signal detection elements are arranged on said scanning plate, and incremental signal detector elements are arranged between said reference pulse signal detection elements.

24. The position measuring system in accordance with claim 19, wherein said light source is a spatially extending light source.

25. The position measuring system in accordance with claim 1, wherein said light source is a point light source.

26. The position measuring system in accordance with claim 1, wherein said light source comprises an array of point light sources, which are arranged perpendicularly with respect to said measuring direction.

* * * * *